United States Patent
Suzuki et al.

(10) Patent No.: US 9,136,685 B2
(45) Date of Patent: Sep. 15, 2015

(54) LIGHTNING PROTECTION STRUCTURE OF BLADE FOR WIND POWER GENERATION

(75) Inventors: Jun Suzuki, Muroran (JP); Atsutoshi Muto, Muroran (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 13/807,395

(22) PCT Filed: Jun. 22, 2011

(86) PCT No.: PCT/JP2011/064307
§ 371 (c)(1),
(2), (4) Date: Dec. 28, 2012

(87) PCT Pub. No.: WO2012/002230
PCT Pub. Date: Jan. 5, 2012

(65) Prior Publication Data
US 2013/0098651 A1 Apr. 25, 2013

(30) Foreign Application Priority Data
Jun. 30, 2010 (JP) .................................. 2010-150103

(51) Int. Cl.
*F03D 11/00* (2006.01)
*H02G 13/00* (2006.01)
*F03D 1/06* (2006.01)

(52) U.S. Cl.
CPC .............. *H02G 13/00* (2013.01); *F03D 1/0658* (2013.01); *F03D 1/0675* (2013.01);
(Continued)

(58) Field of Classification Search
USPC .................................................... 174/30, 3, 2
See application file for complete search history.

(56) References Cited

U.S. PATENT DOCUMENTS 6,457,943 B1 * 10/2002 Olsen et al. ................... 416/230
6,612,810 B1 *  9/2003 Olsen et al. ..................... 416/95
(Continued)

FOREIGN PATENT DOCUMENTS

CN    101336342 A    12/2008
CN    101354016 A    1/2009
(Continued)

OTHER PUBLICATIONS

International Search Report (PCT/ISA/210) dated Sep. 13, 2011 issued by the International Searching Authority in counterpart International Application No. PCT/JP2011/064307.
(Continued)

*Primary Examiner* — Tremesha S Willis
*Assistant Examiner* — Michael E Moats, Jr.
(74) *Attorney, Agent, or Firm* — Sughrue Mion, PLLC

(57) ABSTRACT

A blade for wind power generation includes a lightning receptor configured to form a part of the surface of the blade, and a lightning receiving protrusion that protrudes outward from the surface of the lightning receptor. The lightning receiving protrusion is provided to a surface boundary between the blade and the lightning receptor. The surface boundary configured to protect against the lightning is positioned within a radius of a circle, which is centered on a tip of the lightning receiving protrusion and which has a radius of twice the length of the lightning receiving protrusion. A point where electric field concentration on the surface of the lightning receptor is greatest is moved from the boundary to the tip of the lightning receiving protrusion, so as to significantly reduce a possibility of blade damage associated with lightning striking the boundary when being stroke by the lightning.

7 Claims, 3 Drawing Sheets

(52) U.S. Cl.
CPC ........ *F03D 11/0033* (2013.01); *F05B 2230/50* (2013.01); *F05B 2250/60* (2013.01); *Y02E 10/721* (2013.01); *Y02E 10/722* (2013.01)

(56) References Cited

U.S. PATENT DOCUMENTS

| | | | |
|---|---|---|---|
| 7,377,750 B1 * | 5/2008 | Costin et al. | 416/146 R |
| 7,540,716 B2 * | 6/2009 | Wobben | 416/228 |
| 2004/0028528 A1 * | 2/2004 | Flemming | 416/146 R |
| 2004/0130842 A1 * | 7/2004 | Johansen et al. | 361/117 |
| 2006/0018752 A1 * | 1/2006 | LeMieux | 416/96 R |
| 2006/0045743 A1 * | 3/2006 | Bertolotti et al. | 416/143 |
| 2006/0126252 A1 * | 6/2006 | Mortensen | 361/118 |
| 2007/0253827 A1 * | 11/2007 | Dahl et al. | 416/230 |
| 2008/0145229 A1 * | 6/2008 | Llorente Gonzalez et al. | 416/230 |
| 2008/0193292 A1 * | 8/2008 | Stam et al. | 416/146 R |
| 2009/0053062 A1 | 2/2009 | Arinaga et al. | |
| 2009/0139739 A1 * | 6/2009 | Hansen | 174/2 |
| 2009/0246025 A1 * | 10/2009 | Lewke et al. | 416/146 R |
| 2009/0257881 A1 * | 10/2009 | Ostergaard Kristensen et al. | 416/229 R |
| 2009/0257882 A1 | 10/2009 | Olsen | |
| 2010/0047074 A1 * | 2/2010 | Hernandez et al. | 416/230 |

FOREIGN PATENT DOCUMENTS

| | | | | |
|---|---|---|---|---|
| DE | 10 2008 033 092 A1 | | 1/2010 | |
| DK | WO2007/128314 | * | 5/2006 | ............. F03D 11/00 |
| EP | 2019204 A1 | | 1/2009 | |
| JP | 2000-265938 A | | 9/2000 | |
| JP | 2001-123934 A | | 5/2001 | |
| JP | 2002-227757 A | | 8/2002 | |
| JP | 2003-282295 A | | 10/2003 | |
| JP | 2005-302399 A | | 10/2005 | |
| JP | 2007-46575 A | | 2/2007 | |
| JP | 2007-170268 A | | 7/2007 | |
| JP | 2008-101587 A | | 5/2008 | |
| JP | 2008-115783 A | | 5/2008 | |
| JP | 2009-250040 A | | 10/2009 | |
| JP | 2010-14117 A | | 1/2010 | |
| JP | 2010-223148 A | | 10/2010 | |
| WO | WO 9607825 A1 | * | 3/1996 | |
| WO | WO 2005031158 A2 | * | 4/2005 | |
| WO | 2009/080048 A2 | | 7/2009 | |

OTHER PUBLICATIONS

The Written Opinion (PCT/ISA/237) of the International Searching Authority dated Sep. 13, 2011 issued in counterpart International Application No. PCT/JP2011/064307.

Search Report dated Jan. 16, 2015, issued by the European Patent Office in counterpart European Application No. 11800695.6.

Office Action dated Feb. 28, 2015 issued by The State Intellectual Property Office of The People's Republic of China in counterpart Chinese Application No. 201180031702.0.

* cited by examiner

LIGHTNING PROTECTION STRUCTURE OF BLADE FOR WIND POWER GENERATION

TECHNICAL FIELD

The present invention relates to a lightning protection structure of a blade for wind power generation to prevent the blade, which is utilized for the wind power generation, from being damaged by stroke of lightning.

BACKGROUND ART

Blades for wind power generation currently used is mainly made of glass fiber reinforced plastics (GFRP), and the blade itself is an insulator and has no electrical conductivity. Accordingly, in an era of a small wind power generator it was considered that the blade was not struck by lightning. However, as the wind power generator grows in size, damage of the blade stuck by the lightning is increased. Accordingly, a method of attaching a member (lightning receptor) made of metal to the blade and connecting a lead line (down conductor) to the metallic member and the ground has been generalized. Various shapes or types of the lightning receptors have been proposed and put to practical use.

For example, in PTL 1, there is disclosed a lightning protection system of wind power generation including a conductor ring provided on a blade, and a non-linear resistance body or a zinc oxide type lightning element provided in a rotor case which is equipped with a wind power generator therein, in which the non-linear resistance body or the zinc oxide type lightning element faces the conductor ring.

In PTL 2, there is disclosed a lightning protection structure capable of improving a lightning protection effect by installing an early streamer launching type lightning conductor above the apparatus, in addition to the wind turbine blades which are electrically insulated.

Also, in order to prevent the blade made from the GFRP, in PTL 3, there is disclosed a lightning arrester equipment for a wind turbine capable of eliminating a blade from stroke of lightning, in which one or plural electrode plates are attached between tips and roots of blades to make lightning current flow from an electrode plate to an electrode plate or creep-discharge directly on a blade surface from the electrode plate. Lightning current collected in a hub is led to the ground from the hub through a nacelle and a tower, so that burn of the blade can be completely prevented.

In PTL 4, there is disclosed an arrestor for a wind turbine power generator, in which a metal member opposed to a lower end of a blade at a position apart therefrom is attached to a wind turbine tower, and the metal member is positioned in the vicinity of a tip of a blade largely rotating around the metal member, so that charges on the blade are discharged to the metal member which approaches thereto for every rotation of the blade so as to prevent lightning from striking the blade.

In PTL 5, there is disclosed a thunder resistant protecting device, wherein a mounting base for a protruded lightning rod of a heat-resistant conductive material is fitted to the tip of a blade of a wind turbine which drives a generator so as to cover the tip, then the protruded lightning rod, which absorbs light/thermal energy generated by the thunderbolt and is thermally fused, is detachably mounted to the mounting base for the protruded lightning rod. The protruded lightning rod is projected in a parabolic form from an outer surface of the mounting base for the protruded lightning rod, the mounting base for the protruded lightning rod and a conductive hub at a central portion of the blade are electrically connected by a lightning protection conductor arranged in the blade, a discharge bulb body which is thermally fused is detachably mounted to the end face at the generator side of the hub, a conductive discharge ring which is confronted with a discharge bulb body through a discharge gap is fitted to the end at the wind turbine side of a nacelle, and then the discharge ring is grounded through a lightning protection lead wire.

CITATION LIST

Patent Literature

PTL 1: JP-A-2000-265938
PTL 2: JP-A-2001-123934
PTL 3: JP-A-2002-227757
PTL 4: JP-A-2003-282295
PTL 5: JP-A-2005-302399

SUMMARY OF INVENTION

Technical Problem

With the configuration disclosed in PTLs 1 and 4, however, if the blade becomes large, the distance between the tip of the blade and the non-linear resistance body or the lightning conductor is extended, so that it is not possible to sufficiently prevent the tip of the blade from being struck by the lightning.

Further, in the thunder attack protecting apparatus of the metallic chip tip according to the related art as disclosed in PTLs 2, 3 and 5, there is a boundary portion between the metal portion and the FRP portion, the receiving of lightning causes the temperature to abruptly increase, and, in some cases, the blade is damaged. In addition, an electric field is likely to concentrate on the boundary portion, so that it is difficult to say that a lightning receiving frequency is low. Moreover, since heavy charges are required to work the maintenance of the blade of the wind turbine, there is needed an appliance of which regular maintenance is no longer required.

The present invention has been made in view of the above-described problem, and an object of the present invention is to provide a lightning protection structure in which a protrusion is provided at the vicinity of a boundary between a lightning receptor and a blade body to suppress the boundary from being struck by the lightning.

Solution to Problem

That is, according to a first aspect of the present invention, there is provided a lightning protection structure of a blade for wind power generation according to the present invention comprising: a lightning receptor configured to form a part of a surface of the wind power generation blade; and a lightning receiving protrusion configured to protrude outward from a surface of the lightning receptor, wherein the lightning receiving protrusion is provided to a surface boundary between a blade body and the lightning receptor, and the surface boundary configured to protect against lightning is positioned within a radius of a circle, which is centered on a tip of the lightning receiving protrusion and which has a radius of twice a length of the lightning receiving protrusion.

According to the present invention, an electric field is strongly concentrated on the lightning receiving protrusion rather than the surface boundary between the lightning receptor and the blade body. The lightning is received by the lightning receiving protrusion prior to the surface boundary. Accordingly, it is possible to suppress the lightning from striking the surface boundary, thereby preventing the blade from being damaged.

Further, since the surface boundary configured to protect against lightning is positioned within the radius of the circle that is centered on the tip of the lightning receiving protrusion and has the radius of twice the length of the lightning receiving protrusion, the lightning receiving protrusion reliably suppresses the lightning from directly striking the surface boundary. If the surface boundary configured to protect against lightning is not positioned within the radius of the circle, the effect of preventing the lightning from striking the surface boundary may be reduced.

Accordingly, it is preferable that the lightning receiving protrusion is provided at the position of the surface boundary which is likely to receive the lightning (for example, a circumferential edge of the lightning receptor in its flattened direction).

Further, in the lightning receiving protrusion, it is more preferable that the surface boundary configured to protect against lightning is positioned within the radius of the circle that is centered on the tip of the lightning receiving protrusion and has the radius of $\sqrt{2}$ times the length of the lightning receiving protrusion. Accordingly, the effect of preventing the lightning from striking the surface boundary is more improved. Moreover, as the magnification is low, the lightning receiving protrusion is more close to the surface boundary.

The number of the lightning receiving protrusions is not particularly limited in the present invention. One or at least two lightning receiving protrusions may be provided, and its position and height may be different from each other. The center of the circle may be at the circumferential edge of the tip of the lightning receiving protrusion.

Incidentally, at a part of the surface boundary which is not needed to prevent the stroke of lightning, it is not necessary to position the surface boundary within the radius of the circle.

It is preferable that the lightning receiving protrusion is provided in the vicinity of the surface boundary. The lightning receiving protrusion may be provided at a side (distance of 50% or less of the maximum distance of the lightning receptor in an axial direction of the blade) close to the surface boundary.

By providing the lightning receiving protrusion close to the surface boundary, it is possible to effectively prevent the lightning from striking the surface boundary. Further, as the lightning receiving protrusion is close to the surface boundary, it is possible to obtain the same effect of preventing the lightning from striking the surface boundary. As a result, the striking of lightning on the surface boundary can be effectively prevented, without deteriorating an aerodynamic characteristic. It is preferable to provide one corresponding to the lightning receiving protrusion to a side far away from the surface boundary in view of the aerodynamic characteristic.

According to a second aspect of the present invention, in the lightning protection structure of the wind power generation blade according to the first aspect, the lightning receptor is interposed between halves of the blade body, or is provided to the tip of the blade body.

The lightning receptor may be interposed between the halves of the blade body, or be provided to the tip of the blade body. For the present invention, it is preferable that the lightning receptor of the present invention is provided to the tip of the blade body to improve the lightning receiving effect. The tip side is configured as the lightning receptor, and the lightning receptor is connected to the blade body, which forms the blade. The lightning receptor may continue from the shape of the blade, and may have a tapered shape so that its width is reduced toward its tip. This causes the function of arresting the lightning to be good, and also causes aerodynamics to be good.

Further, in the case where the lightning receptor is interposed between the halves the blade body, the separated blade bodies are connected to each other, with the lightning receptor being interposed therebetween.

The lightning receptor may be made of an electrical conductive material, and pure metal such as Al, Cu, or W, an alloy thereof, a composite material (different materials are mixed with or dispersed in a base material, or different kinds of materials are layered or mixed with each other), and so forth can be used.

The lightning receptor and the lightning receiving protrusion may be made of the same material, and may be made of different materials. In the case of being made of the same material, it is possible to prevent the boundary between the lightning receptor and the lightning receiving protrusion from being damaged due to a thermal expansion difference when the lightning strikes.

According to a third aspect of the invention, in the lightning protection structure of the wind power generation blade according to the first or second aspect, the lightning receiving protrusion has a cross-sectional area of 5 to 1000 mm$^2$.

The cross-sectional area of the lightning receiving protrusion is preferably 5 to 1000 mm$^2$, more preferably 20 to 490 mm$^2$, and most preferably 78 to 310 mm$^2$. Accordingly, for a circumferential shape, the lightning receiving protrusion has preferably a diameter of 25 to 35 mm. For the same reason, the lightning receiving protrusion has more preferably a diameter of 5 to 25 mm, and most preferably a diameter of 10 to 20 mm.

It is preferable that the lightning receiving protrusion has a sufficient cross-sectional area not to be dissolved by the lightning current. Accordingly, an appropriate cross-sectional area can be set depending upon its material, as described above. However, if the cross-sectional area is excessively large, this may cause the aerodynamic characteristic to decrease or the noise to increase.

According to a fourth aspect of the invention, in the lightning protection structure of the wind power generation blade according to any one of the first to third aspects, the lightning receiving protrusion is provided at an angle of 45 to 135 degrees to an axial direction of the blade.

The lightning receiving protrusion is provided to protrude from the surface of the lightning receptor. The protruding direction thereof is not particularly limited, but it is preferable that the protruding direction is intersected with the axial direction of the blade at a predetermined angle (45 to 135 degrees) so that the effect of preventing the strike of lightning by the lightning receiving protrusion can effectively reach the surface boundary. For the same reason, the protruding direction is more preferably 60 to 120 degrees, most preferably 75 to 105 degrees.

According to a fifth aspect of the invention, in the lightning protection structure of the wind power generation blade according to any one of the first to fourth aspects, in a direction perpendicular to the axial direction of the blade and the tip of the lighting receiving protrusion is provided, the tip of the lightning receiving protrusion is positioned at an outside across the surface boundary configured to protect against the lightning.

Since the lightning receiving protrusion is perpendicular to the axial direction of the blade, and the tip of the lightning receiving protrusion is positioned at an outside across the surface boundary configured to protect against the lightning, in a direction of which the tip of the lightning receiving protrusion is positioned, the action of the lightning receiving protrusion to arrest the lightning is reliably superior than the surface boundary, thereby effectively preventing the strike of lightning to the surface boundary.

According to a sixth aspect of the invention, in the lightning protection structure of the wind power generation blade according to any one of the first to fifth aspects, the surface boundary configured to protect against the lightning is positioned at an edge of the lightning receptor in a flattened direction thereof.

The lightning receiving is likely to occur at a relatively thin portion or a pointed portion, and the surface boundary at the edge of the flat receptor is likely to be struck by the lightning. Accordingly, as the lightning receptor is provided at the surface boundary of the edge, it is possible to effectively prevent the lightning from striking the surface boundary.

DESCRIPTION OF EMBODIMENTS

Figure 1:
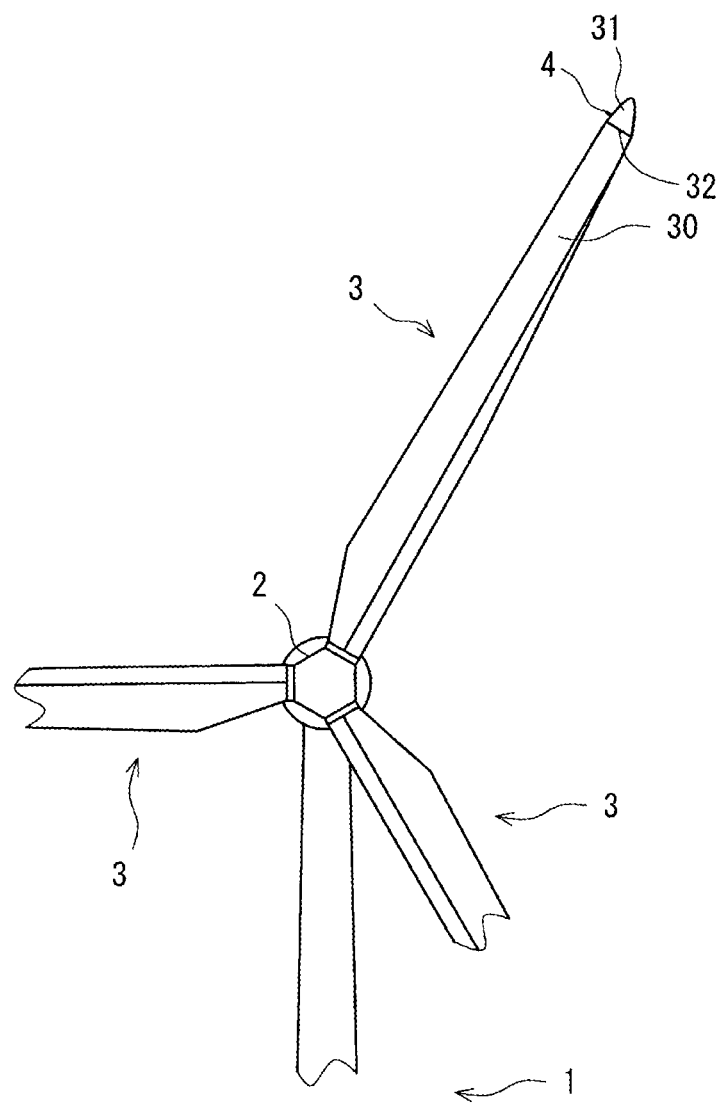
FIG. 1 is a perspective view illustrating a wind turbine including a lightning protection structure according an embodiment of the present invention.

Embodiments of the present invention will now be described with reference to FIGS. 1 to 3.

A wind turbine 1 includes a rotor 2 rotatably supported, and a plurality (three in the drawing) of blades 3 attached to the rotor 2 in a radial type. Each blade 3 has a blade body 30, and a lightning receptor 31 connected to a tip of the blade body 30. A surface boundary 32 is formed at a boundary between the blade body 30 and the lightning receptor 31.

The lightning receptor 31 is formed in a flat shape, and is tapered such that its width becomes thin toward its tip side and its thickness becomes small. The tip of the lightning receptor 31 has a bent shape of a small diameter. The lightning receptor 31 and the blade body 30 are joined to each other in such a way that the lightning receptor is flush with the blade, and the lightning receptor 31 has a good aerodynamic characteristic.

The lightning receptor 31 is provided with a lightning receiving protrusion 4 protruding outward from the surface of the lightning receptor 31 at an edge thereof in a flattened direction, the lightning receiving protrusion 4 being close to the surface receiving 32. It is desirable that the lightning receptor 31 is provided to have a distance of 10 to 150 mm from the surface boundary 32 in an axial direction of the blade 3. If the lightning receptor 31 is too close to the surface boundary 32, the surface boundary 32 is thermally affected when the lightning strikes, which may cause the surface boundary to be damaged. If the distance is too far from the surface receiving 32, it is necessary to extend the length of the lightning receiving protrusion 4, which has a bad effect on the aerodynamic characteristic. The distance is preferably in a range of 20 to 100 mm, more preferably in a range of 30 to 50 mm.

The lightning receiving protrusion 4 is extended along the flattened direction in a direction perpendicular to a blade axis 6 (imaginary line along an extension direction of the blade 3 from the center of the rotor 2) of the blade 3, and a tip thereof is positioned outside rather than a surface boundary portion 32a in the flattened direction. Incidentally, in this embodiment, the lightning receiving protrusion 4 is positioned at the edge at a rear side in a rotational direction of the rotating blade 3 by taking the aerodynamic characteristic into consideration. It can reduce an influence on the aerodynamic characteristic only by providing the lightning receiving protrusion 4 at the rear side in the rotational direction. However, in the present invention, the position of the lightning receptor may not be limited to the rear side in the rotational direction.

Further, in the lightning receiving protrusion 4, the surface boundary portion 32a that is placed in the flattened direction is positioned within a circle 5, which is centered on the tip of the lightning receiving protrusion 4 and has a radius r of twice the length of the lightning receiving protrusion 4. A portion of the surface boundary 32 is positioned inside the circle 5 at the side of the lightning receiving protrusion 4, while a portion of the surface boundary that is spaced apart from the lightning receiving protrusion 4 is positioned outside the circle 5 at the side spaced away from the lightning receiving protrusion 4, which are within the scope of the present invention. In this instance, another lightning receiving protrusion may be provided at a side spaced away from the lightning receiving protrusion 4, and the surface boundary may be positioned within a diameter direction of the circle centered on the lightning receiving protrusion.

That is, it is preferable that a portion of the surface boundary portion for preventing the blade from being struck by the lightning is positioned within the radius of the circle. In this instance, the circle runs along a surface on which the tip of the lightning receiving protrusion and the surface boundary portion for preventing the stroke of lightning are positioned.

Figure 3:
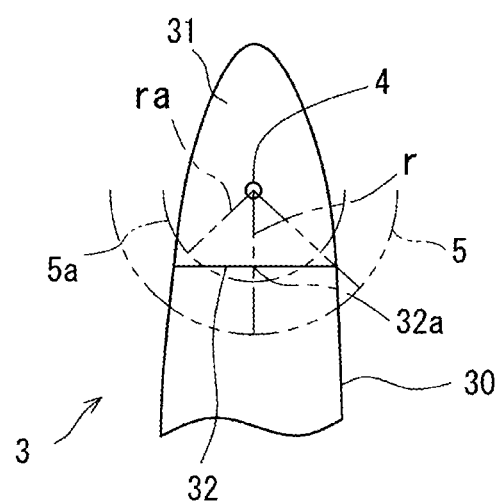
FIG. 3 is a side view illustrating the blade tip of the lightning protection structure.

In FIG. 3, the surface boundary 32 is positioned within the circle at the side of the lightning receiving protrusion 4, so that the effect of the lightning receiving protrusion 4 is effectively obtained. However, for the present invention, a portion of the surface boundary 32 may be positioned within the circle. This form is represented by a circle 5a of a radius ra. The vicinity of the surface boundary portion 32a at the edge in the flattened direction is positioned within the circle 5a, and the stroke of lightning is effectively prevented. At the surface boundary 32 that is positioned outside the circle 5a, the effect of preventing the stroke of lightning by the lightning receiving protrusion 4 may not be effectively obtained.

According to the lightning protection structure, the lightning receptor 31 effectively arrests the lightning to avoid the lightning strike on the blade body 30. In addition, the lightning receiving protrusion 4 arrests the lightning in the vicinity of the surface boundary 32, so that it is possible to effectively suppress the lightning from striking the surface boundary portion 32.

EXAMPLE 1

Figure 2:
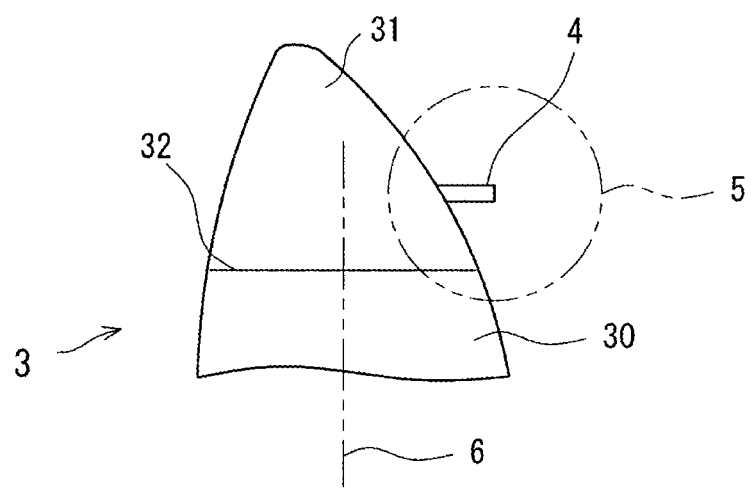
FIG. 2 is a front view illustrating a blade tip of the lightning protection structure.

Next, the lightning protection structure including the lightning receptor 31 made of aluminum material and the lightning receiving protrusion 4 made of aluminum material illustrated in FIG. 2 was attached to an FRP material made which was imitated as the blade body, and was subjected to a 2-D electric field analysis using simulation to predict a position struck by the lightning.

Incidentally, in the analysis, an analysis software MARC2007R1 (a product manufactured by MSC Software Corporation) was utilized, and a point charge was placed at a distance of 1 m from the front end portion of the blade. Letting a position immediately above the tip of the blade to be 0°, point charges were placed at positions of 30°, 60°, and 90°, and positions of 200 mm and 500 mm lowered immediately below the position of ±90° to perform the analysis. At that time, the end portion of the down conductor was set to be a fixed potential.

In FIG. 4(a), H and L denote an attached position and a length of the lightning receiving protrusion 4 to the light receptor 31. That is, L in FIG. 4(a) indicates the length of the lightning receiving protrusion 4, and H in FIG. 4(a) indicates the distance of the attached position of the lightning receiving protrusion 4 to the surface boundary.

The respective lightning receiving protrusions with changed H and L were subjected to the analysis for electric discharge at 6 points, as described above. In FIG. 4(b), there is illustrated an electric field strength ratio of the respective points (point A, point B and point C) of the lightning receiving device on the basis of the tip B of the lightning receiving protrusion. The point A represents the tip of the lightning receptor, the point B represents the tip of the lightning receiving protrusion, and the point C represents the surface boundary at the edge of the lightning receptor in the flattened direction.

The result of the electric field analysis is shown in FIG. 4(b), the lightning receiving protrusion in the range in which the electric field strength ratio of the point C does not exceed the electric field strength ratio of the point B is more preferable. It is more preferable for the lightning receiving protrusion to have more electric discharge positions, in which the electric field strength ratio of the point C does not exceed the electric field strength ratio of the point B.

Figure 4:
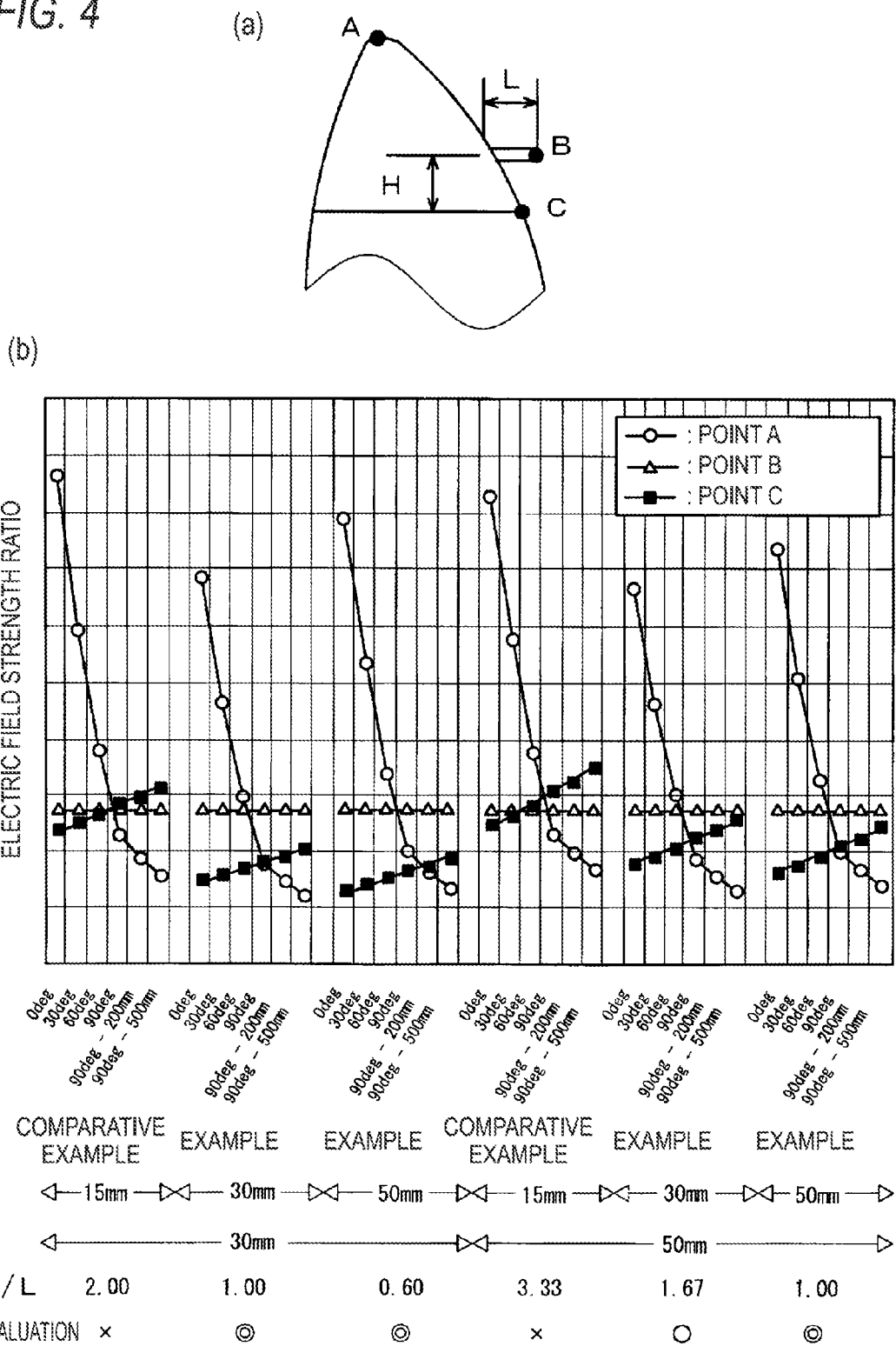
FIG. 4(a) is a diagram illustrating a dimension and an electric-field measuring point, when seen from a front side of the blade tip of the lightning protection structure in FIG. 1, according to an example of the present invention.
FIG. 4(b) is a graph showing a result of analyzing an electric field when lightning is received.

As would be apparent from FIG. 4, in the example of the present invention, the electric field is concentrated on the lightning receiving protrusion, and the concentration of the electric field on the surface boundary between the blade body and the lightning receptor is kept low. As the result, in most cases, the electric field strength ratio of the point C does not exceed the electric field strength ratio of the point B, irrespective of the discharge position. At the position where H/L is 1.67 times on the basis of the tip of the lightning receiving protrusion, the electric field strength ratio of the point C is substantially equal to that of the point B at one discharge position. Accordingly, when the magnification is set to 1.5 times, it is expected that the electric field strength ratio of the point C does not exceed that of the point B at all discharge position. Also, when the magnification is set to 1.0 times, it is expected that the electric field strength ratio of the point C is significantly lowered than that of the point B.

On the other hand, in a comparative example, as the concentration of the electric field on the lightning receiving protrusion is equal to or higher than the concentration of the electric field on the surface boundary, it would be understood that the effect of the lightning receiving protrusion is not sufficiently obtained. In order to minimize the influence on the aerodynamic characteristic, a position of 30 mm from the surface boundary and the lightning receiving protrusion having a length of 30 mm are effective, that is, the magnification is set to 1.0 or less.

The present invention is not limited to the above-described embodiments, and appropriate variations, modifications, or the like may be made. In addition, materials, shapes, dimensions, forms, number, placed positions, or the like of the respective constitutional elements is arbitrary and is not limited thereto, if those can achieve the present invention.

Although the present invention has been described in detail with reference to specific embodiments, those skilled in the art will appreciate that various modifications or variations are possible, without departing from the scope and spirit of the invention.

This application claims priority to Japanese Patent Application No. 2010-150103 filed on Jun. 30, 2010, and the entire disclosure thereof is hereby incorporated herein by reference.

INDUSTRIAL APPLICABILITY

As described above, the lightning receptor is provided to form a part of the surface of the blade for the wind power generation, and the lightning receiving protrusion protrudes outward from the surface of the lightning receptor. The lightning receiving protrusion is provided to the surface boundary between the blade body and the lightning receptor. The surface boundary configured to protect against lightning is positioned within the radius of the circle, which is centered on the tip of the lightning receiving protrusion and which has the radius of twice the length of the lightning receiving protrusion. Therefore, the point where the electric field concentration on the surface of the lightning receptor is greatest is moved from the boundary to the tip of the lightning receiving protrusion, and when the lightning strikes the blade, the possibility of blade damage associated with lightning striking the boundary is significantly reduced. Further, a polarity of the stroke of lightning is generally a negative polarity, so that the possibility of discharge from the upper portion of the wind turbine is very high. However, positive discharge occurs according to circumstances, and a part of the positive lightning may be discharged from a lateral portion or bottom portion of the wind turbine. In this instance, since a discharge angle to the wind turbine blade is increased, the possibility of arresting the lightning by the boundary is increased. Since the electric field concentrating point is factitively formed, the present invention has the high effect on the stroke of lightning at any direction.

REFERENCE SINGS LIST

1: wind turbine
2: rotor
3: blade
30: blade body
31: lightning receptor
32: surface boundary
4: lightning receiving protrusion
5: circle
6: blade axis

The invention claimed is:
1. A lightning protection structure of a fiber reinforced plastic blade for wind power generation, comprising:
a blade comprising a blade body formed of fiber reinforced plastic and a tip of the blade body having a shape defined by a lightning receptor formed of conductive material, an outer surface of the lightning receptor being flush with an outer surface of the blade body;
a surface boundary formed at a boundary between the blade body and the lightning receptor;
the lightning receptor extending from the surface boundary to a distal end of the tip, the lightning receptor having a tapered width and thickness, wherein a width of the lightning receptor becomes smaller in a direction toward the distal end of the tip and a thickness of the lightning receptor becomes smaller in the direction toward the distal end of the tip; and
a lightning receiving protrusion formed of conductive material and configured to protrude outward from the outer surface of the lightning receptor so as to protrude outward from the surface of the blade, wherein the lightning receiving protrusion is provided at a distance of 10 to 150 mm from the surface boundary in an axial direction of the blade, and wherein the surface boundary configured to protect against lightning is positioned within a radius of a circle, which is centered on a tip of the lightning receiving protrusion and which has a radius of twice a length of the lightning receiving protrusion.

2. The lightning protection structure of the blade for wind power generation according to claim 1, wherein the lightning receiving protrusion has a cross-sectional area of 5 to 1000 mm$^2$.

3. The lightning protection structure of the blade for wind power generation according to claim 1, wherein the lightning receiving protrusion is provided at an angle of 45 to 135 degrees to an axial direction of the blade.

4. The lightning protection structure of the blade for wind power generation according to claim 1, wherein in a direction perpendicular to an axial direction of the blade and the tip of the lighting receiving protrusion is positioned, the tip of the lightning receiving protrusion is positioned at an outside across the surface boundary configured to protect against the lightning.

5. The lightning protection structure of the blade for wind power generation according to claim 1, wherein the surface boundary configured to protect against the lightning is positioned at an edge of the lightning receptor in a flattened direction thereof.

6. The lightning protection structure of the blade for wind power generation according to claim 1, wherein the conductive material of the lightning receptor is aluminum.

7. The lightning protection structure of the blade for wind power generation according to claim 1, wherein a ratio (H/L), of the distance (H) of the attached position of the lightning receiving protrusion from the surface boundary to the length (L) of the receiving protrusion, is equal to or less than 1.67.

* * * * *